United States Patent
Chen et al.

(10) Patent No.: US 11,218,686 B2
(45) Date of Patent: Jan. 4, 2022

(54) ADJUSTABLE THREE-DIMENSIONAL IMAGE-CAPTURING DEVICE

(71) Applicant: TRIPLE WIN TECHNOLOGY(SHENZHEN) CO.LTD., Shenzhen (CN)

(72) Inventors: Ye-Quang Chen, New Taipei (TW); Shin-Wen Chen, New Taipei (TW); Jing-Wei Li, Guangdong (CN); Chia-Wei Chen, New Taipei (TW); Sheng-Jie Ding, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 357 days.

(21) Appl. No.: 16/280,232

(22) Filed: Feb. 20, 2019

(65) Prior Publication Data

US 2020/0221065 A1 Jul. 9, 2020

(30) Foreign Application Priority Data

Jan. 8, 2019 (CN) .......... 201910017287.1

(51) Int. Cl.
*H04N 13/239* (2018.01)
*G03B 35/08* (2021.01)
*H04N 13/296* (2018.01)
*H04N 13/00* (2018.01)

(52) U.S. Cl.
CPC .......... *H04N 13/239* (2018.05); *G03B 35/08* (2013.01); *H04N 13/296* (2018.05); *H04N 2013/0081* (2013.01); *H04N 2213/001* (2013.01)

(58) Field of Classification Search
None
See application file for complete search history.

(56) References Cited

U.S. PATENT DOCUMENTS

| | | | | |
|---|---|---|---|---|
| 4,751,570 A | * | 6/1988 | Robinson | H04N 13/239 348/47 |
| 5,978,015 A | * | 11/1999 | Ishibashi | G03B 35/08 348/47 |
| 5,978,143 A | * | 11/1999 | Spruck | H04N 13/117 359/619 |
| 6,320,610 B1 | * | 11/2001 | Van Sant | H04N 13/207 348/143 |
| 7,933,512 B2 | * | 4/2011 | Campbell | G03B 35/00 396/325 |

(Continued)

FOREIGN PATENT DOCUMENTS

| | | | | |
|---|---|---|---|---|
| CN | 104363317 | | 2/2015 | |
| CN | 108696734 A | | 10/2018 | |
| WO | WO-2017188781 A1 | * | 11/2017 | G03B 11/00 |

*Primary Examiner* — Gelek W Topgyal
(74) *Attorney, Agent, or Firm* — ScienBiziP, P.C.

(57) ABSTRACT

A three-dimensional image-capturing device includes a first camera, a second camera, a driving member and a sensing member. The second camera is at one side of the first camera and is capable of being moved laterally by the driving member. After depth-sensing and establishing orientations in an image, the driving member is able to drive the second camera to move relative to the first camera, to change a distance between the first camera and the second camera. Such relative movement allows a greater range of three dimensionality for face recognition and other purposes.

18 Claims, 6 Drawing Sheets

(56) References Cited

U.S. PATENT DOCUMENTS

| | | | | |
|---|---|---|---|---|
| 8,514,291 B2* | 8/2013 | Chang | G03B 35/24 | 348/211.11 |
| 9,237,331 B2* | 1/2016 | Heinzle | H04N 13/296 | |
| 10,785,467 B2* | 9/2020 | Chen | H04N 13/25 | |
| 2004/0160512 A1* | 8/2004 | Lee | H04N 13/207 | 348/42 |
| 2007/0008405 A1* | 1/2007 | Benosman | H04N 13/246 | 348/47 |
| 2010/0177167 A1* | 7/2010 | Hu | H04N 1/2166 | 348/47 |
| 2011/0122267 A1* | 5/2011 | Ahn | G03B 5/00 | 348/208.7 |
| 2011/0141241 A1* | 6/2011 | Lee | H04N 13/296 | 348/47 |
| 2011/0294307 A1* | 12/2011 | Hsu | H05K 1/147 | 439/55 |
| 2012/0062707 A1* | 3/2012 | Seo | H04N 13/239 | 348/47 |
| 2012/0098938 A1* | 4/2012 | Jin | H04N 13/271 | 348/47 |
| 2013/0011045 A1* | 1/2013 | Lee | G06T 3/40 | 382/154 |
| 2013/0076870 A1* | 3/2013 | Kitzen | H04N 13/207 | 348/49 |
| 2013/0265394 A1* | 10/2013 | Lim | H04N 5/2253 | 348/46 |
| 2014/0098193 A1* | 4/2014 | Geris | H04N 13/239 | 348/47 |
| 2014/0184891 A1* | 7/2014 | Lee | H04N 5/23212 | 348/357 |
| 2016/0029008 A1* | 1/2016 | Prechtl | H04N 5/23206 | 348/48 |
| 2016/0174362 A1* | 6/2016 | Doran | H05K 1/0227 | 361/748 |

* cited by examiner

ADJUSTABLE THREE-DIMENSIONAL IMAGE-CAPTURING DEVICE

FIELD

The subject matter herein generally relates to image-capturing devices.

BACKGROUND

There is demand for 3D camera devices, such as mobile phones and notebook computers. 3D camera devices includes twin cameras for clearer and better quality 3D images. However, distance between the two cameras is relatively fixed, resulting in a narrow range of the three-dimensional effects.

Therefore, there is room for improvement within the art.

BRIEF DESCRIPTION OF THE DRAWINGS

Implementations of the present technology will now be described, by way of embodiments only, with reference to the attached figures.

DETAILED DESCRIPTION

Figure 1:
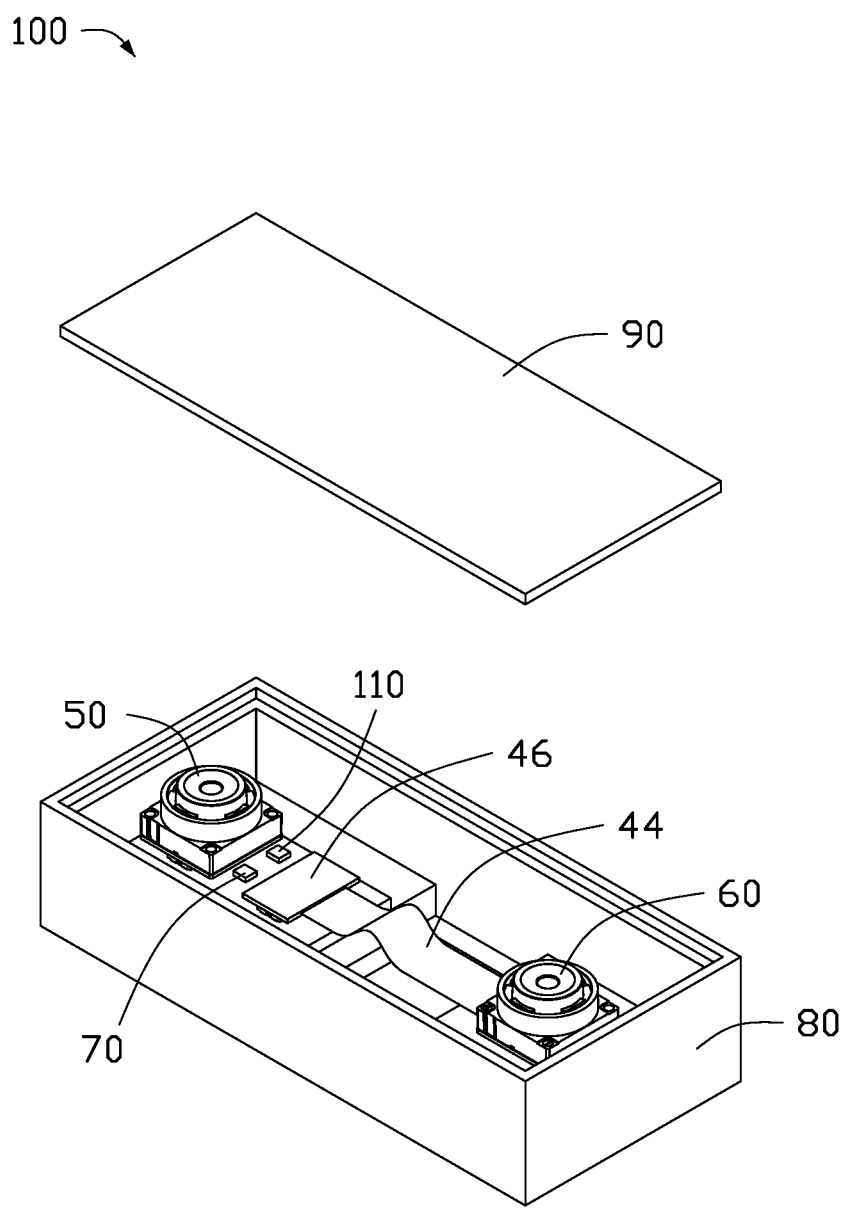
FIG. 1 is an isometric view of a three-dimensional camera device in accordance with one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 illustrates a three-dimensional sensing device 100. The three-dimensional sensing device 100 includes a pedestal 10, a driving member 20, a first printed circuit board 30, a second printed circuit board 40, a first camera 50, a second camera 60, an image processor 70, a housing 80, a transparent cover 90, and a distance sensing unit 110.

The pedestal 10 is substantially rectangular and includes a first supporting portion 12 and a guide rail portion 14 located at one side of the first supporting portion 12. The first supporting portion 12 comprises a flat surface.

Figure 2:
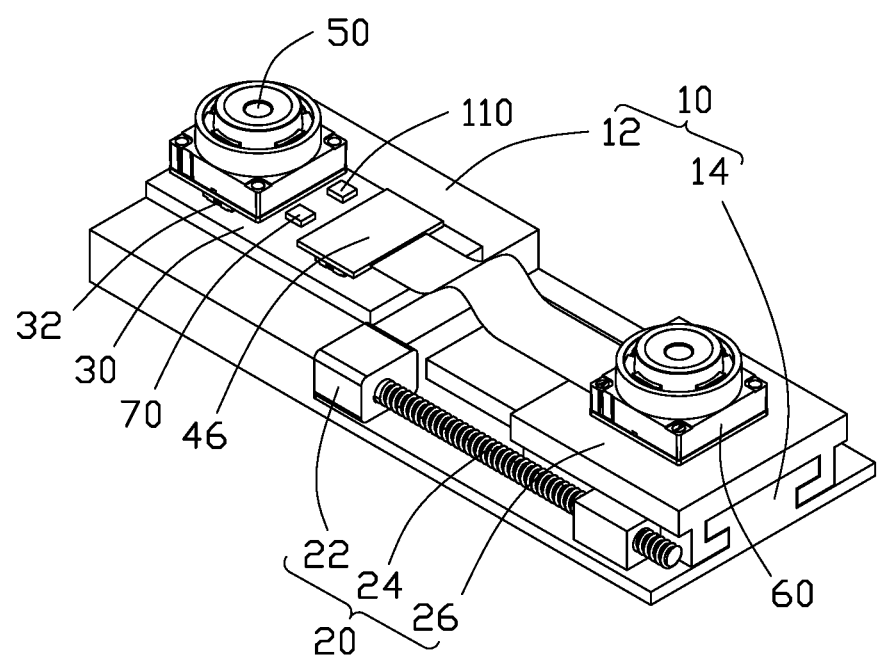
FIG. 2 is an isometric view of the device of FIG. 1 with housing removed and a transparent cover.
Figure 3:
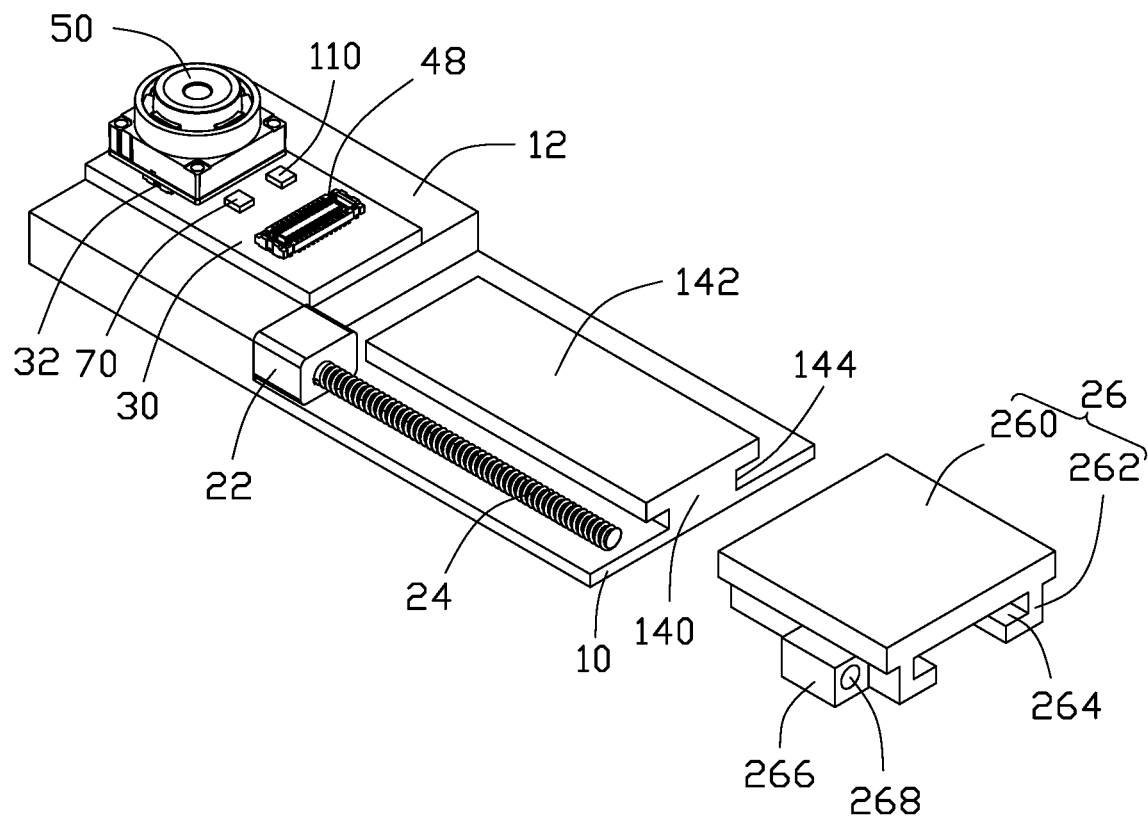
FIG. 3 is an exploded view of the device in FIG. 2.
Figure 4:
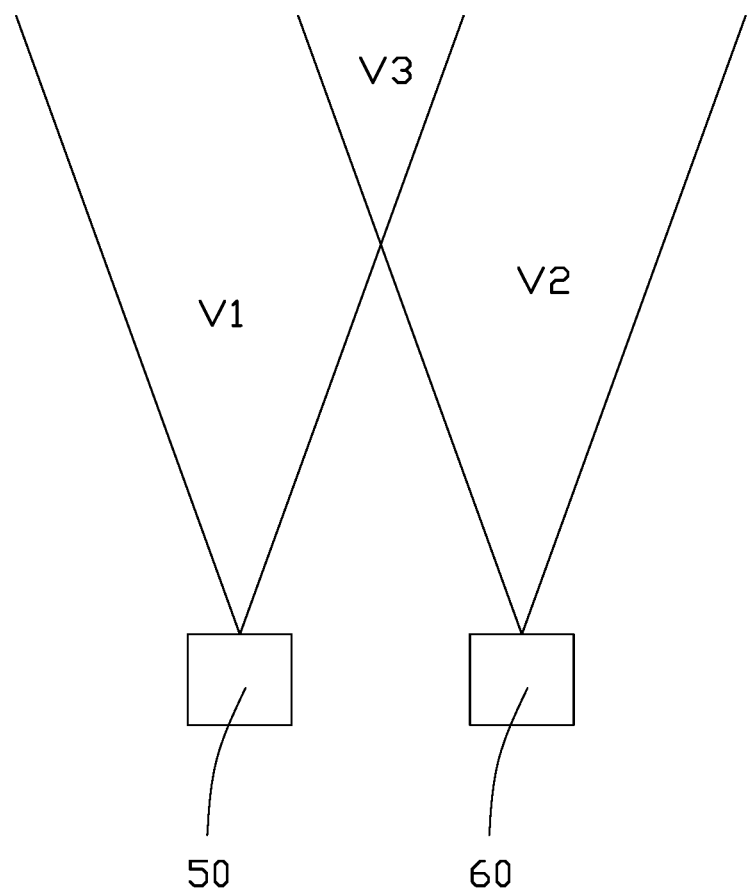
FIG. 4 shows fields of view of a first camera and of a second camera in the device in FIG. 2.
Figure 5:
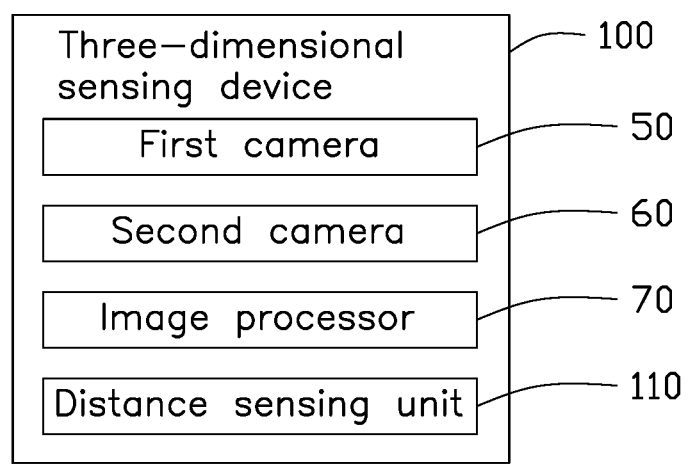
FIG. 5 is a block diagram of functional modules of the device of FIG. 2.

The guide rail portion 14 includes a substrate 140 protruding from the pedestal 10 and a first plate 142 perpendicularly connected to the substrate 140. Two ends of a width direction of the first plate 142 are respectively outside two ends of a width direction of the substrate 140, as shown in FIG. 2 and FIG. 3. Top surface of the pedestal 10, the substrate 140 and the first plate 142 form two parallel sliding channels 144 at opposite ends of a length direction of the substrate 140.

The driving member 20 is mounted on the pedestal 10 and is able to drive the second camera 60 to move relative to the first camera 50. The second camera 60 and the first camera 50 both capture images of an object within their fields of view V3, but from slightly different angles, and 3D images of the object can be better synthesized, and the correct focusing of the second camera 60 is facilitated. In the embodiment, the first camera 50 has a field of view V1, the second camera 60 has a field of view V2, field of view V3 V2, V3 is the overlap of V1 and V2. The driving member 20 includes a driving body 22, a driving shaft 24 connected with the driving body 22, and a moving block 26 connected with the driving shaft 24. The moving block 26 is provided on the guide rail portion 14 and the driving body 22 can drive the moving block 26 to move along the guide rail portion 14.

In the embodiment, the moving block 26 includes a second plate 260 and two connecting arms 262. The connecting arm 262 is L-shaped. The two connecting arms 262 are vertically connected to bottom of the second plate 260 and are clawed toward each other. The second plate 260 is located on the first plate 142, each connecting arm 262 and the second plate 260 form a receiving channel 264. The receiving channel 264 receives the first plate 142, and the connecting arms 262 can slide along the slide groove 144.

The moving block 26 includes a connecting block 266 on an outer surface of one connecting arm 262. The connecting block 266 defines a through hole 268. An extending direction of the through hole 268 is same as that of the slide groove 144. The driving body 22 is provided on the pedestal 10 and the driving shaft 24 passes through the through hole 268 to drive the moving block 26 to move along the slide groove 144.

The first printed circuit board 30 is a rigid board and fixed on the first supporting portion 12. The first printed circuit board 30 includes a first connector 32, the first camera 50 is fixed and electrically connected to the first printed circuit board 30 via the first connector 32.

The second printed circuit board 40 is a rigid-flexible circuit board and includes a first rigid board 42, a flexible board portion 44 extending from one end of the first rigid board 42, and a second rigid board 46 connected to the flexible board portion 44. The first rigid board 42 is fixed on the moving block 26. The second camera 60 is fixed and electrically connected to the first rigid board 42, and the second camera 60 on the moving block 26 is able to change distance between the second camera 60 and the first camera 50. The second rigid board 46 is electrically connected to the first printed circuit board 30 through a second connector 48 fixed on the first printed circuit board 30. A length of the flexible board portion 44 is larger than a distance that the second camera 60 can move relative to the first camera 50, to avoid tensile damage of the flexible board portion 44 during the movement of the second camera.

Figure 6:
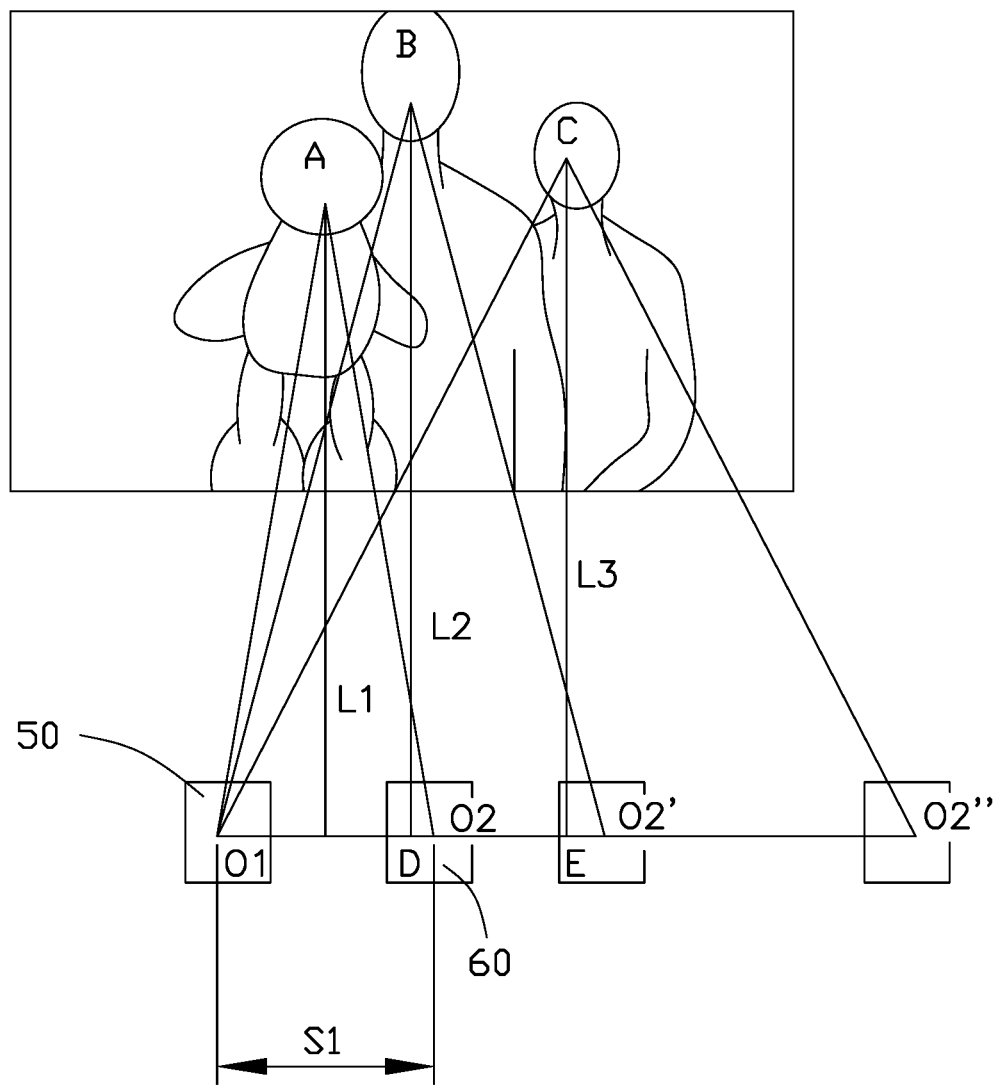
FIG. 6 illustrates working principles of the device in FIG. 2.

Referring to FIG. 6, in the embodiment, a distance between an optical axis of the first camera 50 and an optical axis of the second camera 60 is S1, the driving member 20 can drive the second camera 60 to move distance S1 within a predetermined range. The predetermined range can be determined according to actual needs.

The image processor 70 and the distance sensing unit 110 are integrated on the first printed circuit board 30. The distance sensing unit 110 is configured to sense a distance between an object to be photographed and the three dimensional sensing device 100. For example, the distance sensing unit 110 extracts and detects a feature point on an image of a scene. If there is a human face in the scene, the feature point may be a central point of the face or a tip of the nose. A vertical distance (depth of field) from the feature point to a horizontal line connecting the first camera 50 and the second camera 60 can also be established.

The image processor 70 receives and processes images taken by the first camera 50 and the second camera 60 to obtain 3D images of the object.

The housing 80 is fixed on the pedestal 10. The transparent cover 90 covers the housing 80 to seal the first camera 50 and the second camera 60. Light can enter the first camera 50 and the second camera 60 via the transparent cover 90.

The three-dimensional sensing device 100 can sense a face or a person's shoulder, for example. Sensing a face is for face recognition, and sensing person's shoulder is for man-machine interaction. A working principle of the three-dimensional sensing device 100 is as follows.

When an object in an image needs to be identified, the object will be located in front of the three-dimensional sensing device 100, and will be in overlapping fields of view V3 formed by a first field of view V1 of the first camera 50 and a second field of view V2 of the second camera 50. FIG. 6 shows objects A, B, and C located in the range of the overlapping fields of view V3 and different depths of field for different objects are clear. The image shows depths of fields of objects A, B, and C are respectively L1, L2, and L3, wherein L1<L3<L2. In the embodiment, the field of view V1 of the first camera 50 is same as field of view V2 of the second camera 50. In other embodiments, the field of view V1 of the first camera 50 can also be different from the field of view V2 of the second camera 50.

Before the second camera 60 is moved, the first camera 50 of the three-dimensional sensing device 100 is in the initial position O1, and the second camera 60 is in the initial position O2. The 3D sensing device 100 is used to sense an object in the overlapping fields of view V3, and a depth of field is within a certain distance range, such as L1.

When the object B needs to be identified, first, the distance sensing unit 110 senses the depth of field L2 of the object B, and secondly, the second camera 60 is moved accordingly.

In particular, the distance sensing unit 110 extracts a feature point of the object B. In the embodiment, the point B is a facial feature point of the object B. A horizontal line between the first camera 50 and the second camera 60 is O1O2, and a vertical connecting line from the feature point B to the horizontal line O1O2 is BD. Point D is thus an intersection point of the feature point B to the horizontal line O1O2. Since the first camera 50 is fixed in position, the driving member 20 is configured to control the moving block 26 to move, and a distance to the second camera 60 is changed. The change in distance ensures that the second camera 60 moves from O2 to O2', to meet O2'D=O1D. The second camera 60 can the capture image of the object B at the location O2'.

Thirdly, the first camera 50 and the second camera 60 both capture images of the object B in the fields of view V3, and then, the image processor 70 is able to recognize object B in the 3D image.

If the object C needs to be identified, the distance sensing unit 110 senses the depth of field L3 of the object C, and extracts a feature point of the object C. In the embodiment, the point C is a facial feature point of the object C. A vertical connecting line of the feature point C to the horizontal line O1O2 is CE, that is, point E is an intersection point of the feature point C to the horizontal line O1O2. The first camera 50 is fixed in place, and the distance between the first camera 50 and the intersection point E is fixed. The driving member 20 controls the second camera 60 to move from O2 to O2" to meet O2"D=O1E. The second camera 60 then captures image of the object B at the location O2".

Then, the image processor 70 is able to recognize the object C in the 3D image.

The three-dimensional sensing device 100 can be used for face recognition. For example, a plurality of individuals who need to be recognized are standing in front of the three-dimensional sensing device 100. Depths of field of the plurality of individuals are different from each other. As long as all individuals are within overlapping fields of view of the two cameras, the 3D sensing device 100 may recognize in turn each face. In this way, face recognition is realized by controlling the movement of the second camera 60 instead of asking the individuals to move. That is, when the second camera 60 moves in a direction away from the first camera 50, the range of depths of field sensed by the three-dimensional sensing device 100 is larger than the range of depths of field when the second camera is not capable of moving, thus realizing face recognition in an extended range.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A three-dimensional image-capturing device comprising:
   a first camera having a first field of view;
   a driving member;
   a distance sensing unit electrically connecting to the driving member;

a second camera having a second field of view, the second camera being placed at one side of the first camera and connected to the driving member; and an image processor being electrically connected to the first camera, wherein the distance sensing unit is adapted for sensing a distance between a feature point of an object to be identified and an intersection point of a horizontal line connecting the first camera to the second camera and a horizontal line from the feature point to the horizontal line, the driving member is adapted for driving the second camera to linearly move according to the distance relative to the first camera, causing a distance between the second camera and the intersection point to be equal to a distance between the first camera and the intersection point; each of the first camera and the second camera captures images of the object to be identified in an overlapping field of view of the first field of view and the second first field of view, the image processor receives and processes images taken by the first camera and the second camera to obtain 3D images of the object to be identified.

2. The three-dimensional image-capturing device of claim 1, further comprises a pedestal and a first printed circuit board placed on the pedestal, the first printed circuit board comprising a first connector, the image processor being placed on the first printed circuit board, and the first camera being fixed and electrically connected to the first printed circuit board via the first connector.

3. The three-dimensional image-capturing device of claim 2, further comprises a second printed circuit board, wherein the second printed circuit board is a rigid-flexible circuit board and comprises a first rigid board, a flexible board portion extending from one end of the first rigid board and a second rigid board connected to the flexible board portion, the second rigid board is electrically connected to the first printed circuit board through a second connector fixed on the first printed circuit board, the second camera is electrically connected to the first rigid board.

4. The three-dimensional image-capturing device of claim 3, wherein:

the driving member is mounted on the pedestal and comprises a driving body, a driving shaft connected with the driving body and a moving block connected with the driving shaft, the driving body is adapted for driving the moving block moving along the driving shaft, and the second camera is fixed on the moving block.

5. The three-dimensional image-capturing device of claim 4, wherein:

the pedestal is substantially rectangular and comprises a first supporting portion and a guide rail portion at one side of the first supporting portion, the first supporting portion comprises a flat surface, the first camera is fixed on the first supporting portion.

6. The three-dimensional image-capturing device of claim 5, wherein:

the moving block is placed on the guide rail portion and clamed on the guide rail portion.

7. The three-dimensional image-capturing device of claim 6, wherein:

the guide rail portion comprises a substrate protruding from the pedestal and a first plate perpendicularly connected to the substrate, two ends of a width direction of the first plate are outside two ends of a width direction of the substrate, and top surface of the pedestal, the substrate and the first plate form two parallel sliding channels at opposite ends of a length direction of the substrate.

8. The three-dimensional image-capturing device of claim 7, wherein:

the moving block comprises a second plate placed on the first plate and two connecting arms, the connecting arm is L-shaped, the two connecting arms vertically connected to bottom of the second plate and are clawed toward each other.

9. The three-dimensional image-capturing device of claim 8, wherein:

each of the connecting arms and the second plate form a receiving channel, the receiving channel receives the first plate, and the connecting arms is configured to slide along the slide groove.

10. The three-dimensional image-capturing device of claim 9, wherein:

the moving block comprises a connecting block on an outer surface of one connecting arm, the connecting block defines a through hole, an extending direction of the through hole is same as an extending direction of the slide groove.

11. The three-dimensional image-capturing device of claim 10, further comprises a housing fixed on the pedestal, the transparent cover covering the housing to seal the first camera and the second camera.

12. A three-dimensional image-capturing device comprising:

a first camera;

a driving member; and a distance sensing unit electrically connecting to the driving member;

a second camera being placed at one side of the first camera; the second camera being connected to the driving member; wherein the distance sensing unit is adapted for sensing a distance between a feature point of an object to be identified and an intersection point of a horizontal line connecting the first camera to the second camera and a horizontal line from the feature point to the horizontal line, the driving member is adapted for driving the second camera to linearly move according to the distance to change a distance between the first camera and the second camera, causing a distance between the second camera and the intersection point to be equal to a distance between the first camera and the intersection point.

13. The three-dimensional image-capturing device of claim 12, further comprises a pedestal and a first printed circuit board placed on the pedestal, the first printed circuit board comprising a first connector and the first camera is fixed and electrically connected to the first printed circuit board via the first connector.

14. The three-dimensional image-capturing device of claim 13, wherein:

the pedestal is substantially rectangular and includes a first supporting portion and a guide rail portion located at one side of the first supporting portion, the first supporting portion comprises a flat surface, the first camera is fixed on the flat surface of the first supporting portion.

15. The three-dimensional image-capturing device of claim 14, wherein:

the driving member is mounted on the pedestal and comprises a driving body, a driving shaft connected with the driving body and a moving block connected with the driving shaft, the driving body is able to drive the moving block moving along the driving shaft, and the second camera is fixed on the moving block.

16. The three-dimensional image-capturing device of claim 15,
further comprises a second printed circuit board, wherein the second printed circuit board is a rigid-flexible circuit board and comprises a first rigid board, a flexible board portion extending from one end of the first rigid board and a second rigid board connected to the flexible board portion, the second rigid board is electrically connected to the first printed circuit board through a second connector fixed on the first printed circuit board, the second camera is electrically connected to the first rigid board, the first rigid board is fixed on the moving block.

17. The three-dimensional image-capturing device of claim 16, wherein:
a length of the flexible board portion is larger than a distance that the second camera can move relative to the first camera.

18. The three-dimensional image-capturing device of claim 13, wherein:
further comprises an image processor being electrically connected to the first camera, the second camera and the driving member; the first camera and the second camera capture images of an object to be identified in an overlapping field of view formed by a first field of view of the first camera and a second first field of view of the second camera, the image processor receives and processes images taken by the first camera and the second camera to obtain 3D images of the object to be identified.

* * * * *